United States Patent [19]
Korsell et al.

[11] 3,914,968
[45] Oct. 28, 1975

[54] SEALING ARRANGEMENT FOR HIGH-PRESSURE PRESS

[75] Inventors: Torsten Korsell; Sture Lundstrom, both of Robertsfors, Sweden

[73] Assignee: Allmanna Svenska Elektriska Aktiebolaget, Vasteras, Sweden

[22] Filed: Oct. 3, 1974

[21] Appl. No.: 511,509

[30] Foreign Application Priority Data
Apr. 30, 1974 Sweden .......................... 7405791

[52] U.S. Cl. .................................... 72/60; 72/272
[51] Int. Cl.² ......................................... B21D 22/10
[58] Field of Search ................... 72/60, 272; 220/46

[56] References Cited
UNITED STATES PATENTS

| | | | |
|---|---|---|---|
| 3,379,043 | 4/1968 | Fuchs, Jr. .............................. | 72/60 |
| 3,557,996 | 1/1971 | Campbell .............................. | 72/60 |
| 3,559,436 | 2/1971 | Nilsson .................................. | 72/60 |
| 3,852,986 | 12/1974 | Fuchs, Jr. .............................. | 72/60 |

*Primary Examiner*—C. W. Lanham
*Assistant Examiner*—Robert M. Rogers

[57] ABSTRACT

In a high-pressure press in which a pressure piston or die projects into the high-pressure cylinder, a seal is provided between the pressure piston or die and the wall of the cylinder by inner and outer rings resting against seal holders at the end of the cylinder. The inner surface of the inner ring is provided with at least a tangentially extending groove which is connected by passages with the pressure space within the cylinder.

4 Claims, 5 Drawing Figures

SEALING ARRANGEMENT FOR HIGH-PRESSURE PRESS

BACKGROUND OF THE INVENTION

1. Field of the Invention

The invention relates to sealing arrangements for high-pressure presses.

2. The Prior Art

In presses for hydrostatic extrusion the work is carried out at very high pressure levels, the working pressure usually being between 10 and 20 kbar. At this high pressure a reliable seal must be obtained between the inner wall of a press cylinder and a die or a die support and between the inner wall of the cylinder and a punch or piston projecting into the cylinder, said punch or piston when inserted into the cylinder achieving the necessary high extrusion pressure in a pressure medium which is enclosed in a pressure chamber composed of said cylinder, the die and the piston. A billet to be extruded is present in the pressure chamber and is pressed out through the die under the action of the pressure medium. When the pressure is raised from atmospheric level to extrusion level, the inner diameter of the cylinder increases by 0.5 to 1 percent, which makes it difficult to provide a seal which will prevent pressure medium from streaming out through a gap between the cylinder wall and the piston and the die, respectively, which are widened during the pressure increase. It is particularly difficult to accomplish a seal between the movable piston and the cylinder wall which has a satisfactory sealing capacity and a long life. Any leakage occurring at such high pressures may produce severe surface damage on the pressure-generating piston requiring an exchange of this expensive part. U.S. Pat. No. 3,620,059 discloses and describes further a press of the same kind as described in this application.

The Larker applications Ser. No. 462,401 now U.S. Pat. No. 3,865,387 and 462,402, both filed Apr. 19, 1974 and Syvakari application Ser. No. 464,461 now U.S. Pat. No. 3,877,707, filed Apr. 25, 1974 disclose different variants of high-pressure seals for hydrostatic extrusion presses having a first sealing ring making contact with the cylinder wall and a seal holder and a second sealing ring sealing against a die or piston and a seal holder. These seals have provided great improvements and have involved a considerable increase in their lives. However, certain drawbacks remain regarding the sealing between the cylinder and the pressure-generating piston. The ring is pressed by the pressure medium with great force, 10 to 20 kbar, against the movable pressure-generating piston. The friction between the ring, usually of bronze, and the pressure-generating piston of steel, possibly with a surface layer of another metal, for example chromium, will be great. The ring may move with the piston so that a gap arises between the seal holder and the ring. Pressure medium leaks out through this gap. This leakage may make the necessary pressure increase impossible or may damage sealing surfaces so that the sealing ring and the seal holder are destroyed. The high surface pressure between the ring and the piston may also give rise to surface damage on the inner surface of the ring and on the piston surface, which causes a leakage between the ring and the piston and which necessitates an exchange of these parts. Exchange of the pressure-generating piston is time-wasting and expensive.

SUMMARY OF THE INVENTION

The present invention relates to a high-pressure press, especially a press for hydrostatic extrusion, with such a design of the high-pressure seal that the above-mentioned drawbacks in presses with hitherto known seals are eliminated. According to the invention, the sealing ring which is nearest around the die, the die support or the pressure-generating piston is made with one or more depressions in the inner surface of the ring, said depressions communicating with the pressure-medium-filled space of the pressure chamber through one or more radial apertures through the ring or through apertures between the depressions and the inner end of the ring. The ring is suitably provided on the inside with one or more tangential slots and said apertures or slots open out into a tangential slot or slots.

Through the apertures in the ring and through the slots, respectively, there is a connection between the press chamber and the contact surface between the sealing ring and the pressure-generating piston and pressure medium is pressed in between the ring and the piston. In this way lubrication of the surfaces which slide against each other and also a certain decompression are obtained, which reduces the stresses. In the event of a leakage between the sealing ring and the piston in the area between the slots of the sealing ring and its outermost part, the apertures and the slots in the ring serve as very powerful throttling means which strongly reduce the effect of such a leakage. It has been found that with such a structure the stresses on the ring and on piston surfaces decrease.

The surface damage on the ring and the piston surfaces which occurred in previously used seals due to the friction is eliminated when using rings constructed in accordance with the invention. Another and unexpected effect is also obtained. It has been found that the ring according to the invention provides a perfect seal even against a pressure-generating piston having surface damage of a kind which has made it impossible to obtain a seal with hitherto known sealing constructions. The effect is thus that the stresses on the surfaces sealing against each other are reduced so that the sealing ring and the piston can be used for a longer time before surface damage of the previously known kind occurs and that a perfect seal can be obtained even in case of surface damage which previously necessitated an exchange of a pressure-generating piston.

BRIEF DESCRIPTION OF THE DRAWINGS

The invention is described more fully with reference to the accompanying figures.

DESCRIPTION OF THE PREFERRED EMBODIMENTS

Figure 1:
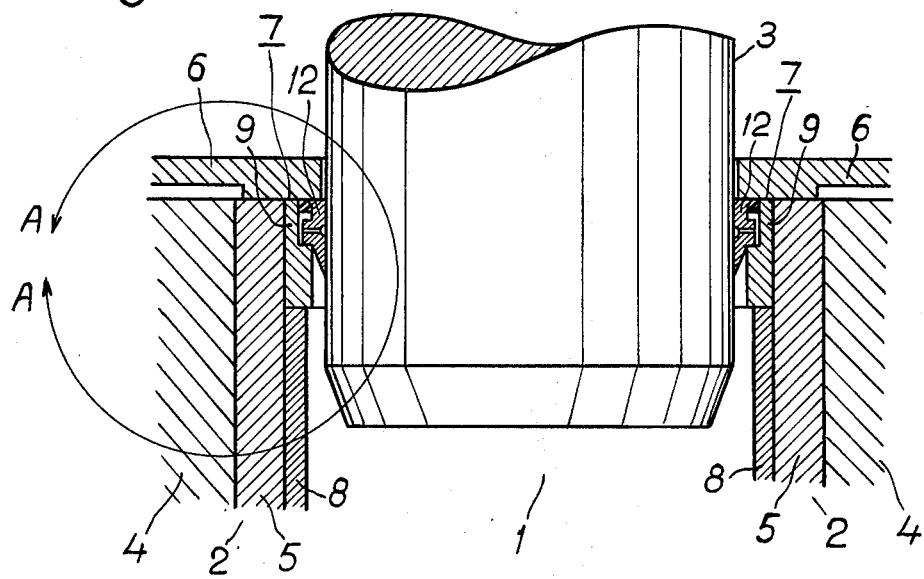
FIG. 1 shows a section through a high-pressure chamber in a hydrostatic extrusion press.

In the figures, 1 designates a pressure chamber which is composed of a high-pressure cylinder 2, a pressure-generating piston 3 and a die (not shown). The piston and die are parts which project into the high-pressure cylinder. When the piston 3 is inserted, a necessary extrusion pressure is generated in a pressure medium enclosed in the pressure chamber. The high-pressure cylinder 2 contains a cylinder 4 which may be built up in a manner, known per se, of a tube and prestressed strips of wires wound around it. Inside the tube is a liner 5. The cylinder 4 is provided with end pieces 6 forming seal holders which take up axial forces operating on the seal 7. Inside the liner 5 is a spacing sleeve 8 which, on the one hand, forms a protection for the liner, and, on the other, forms a spacing element which axially secures the seal 7 and a corresponding seal (not shown) to the other end of the cylinder.

The seal 7 contains a first sealing ring 9 of metal having a cylindrical sealing surface 10 facing the cylinder wall, the liner, and a sealing surface, the end surface 11, facing the seal holder 6, and an inner second sealing ring 12 of metal, usually bronze, having an inner cylindrical sealing surface 13 facing the piston 3 and a sealing surface, the end surface 14, facing the seal holder 6. The ring 9 is formed with a shoulder 16. The ring 12 has a surface 15 facing said shoulder. Because of the shoulder 16, the ring 12 is axially fixed. The rings 9 and 12 and the seal holder 6 form an annular space 17 in which there is an O-ring 18.

Figure 2:
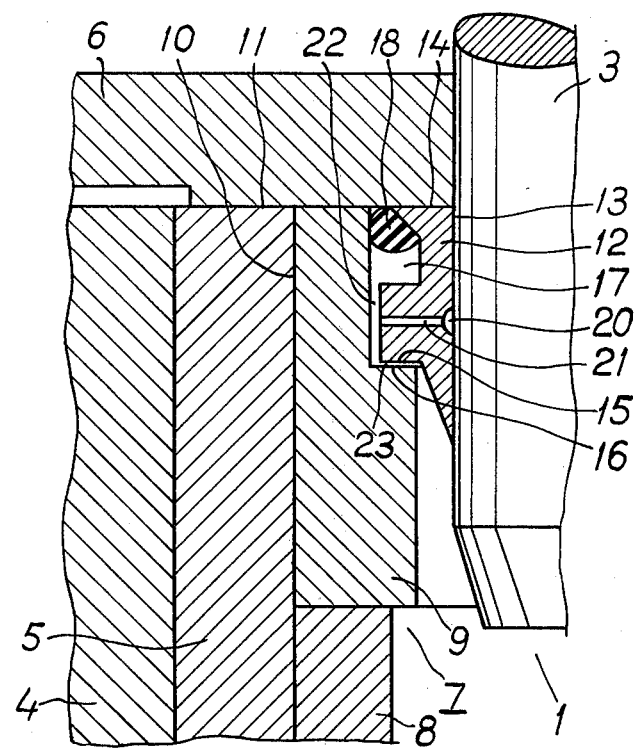
FIG. 2 shows on a larger scale the section A—A in FIG. 1.

In the embodiment according to FIG. 2 the ring 12 is shaped with an annular groove 20 and with a number of radial apertures 21 passing completely through the ring and opening out into the groove 20 and into the gap 22 between the rings 9 and 12. Thus, the groove 20 communicates with the pressure chamber 1 through the apertures 21 and the gaps 22 and 23 with the pressure medium-filled pressure chamber 1. Pressure medium is pressed into the slot 20 when the pressure increases in the pressure chamber. Two effects are obtained. For one thing, the pressure medium lubricates the surfaces on the piston 3 and the ring 12 which slide against each other, and secondly the pressure medium between the ring 12 and the piston 3 results in a certain balancing so that the force by which the ring 12 is pressed against the piston 3 is reduced. The ring 12 can be provided with a plurality of parallel grooves 20 and apertures which open out into these grooves, or part of the surface facing the piston 3 can be provided with a helical aperture covering the middle part of the ring. Possible leakage at the outer part of the sealing ring is limited because of the throttling which is obtained in the apertures 21, and therefore the eroding effect of the leakage is reduced or completely eliminated.

Figure 3:
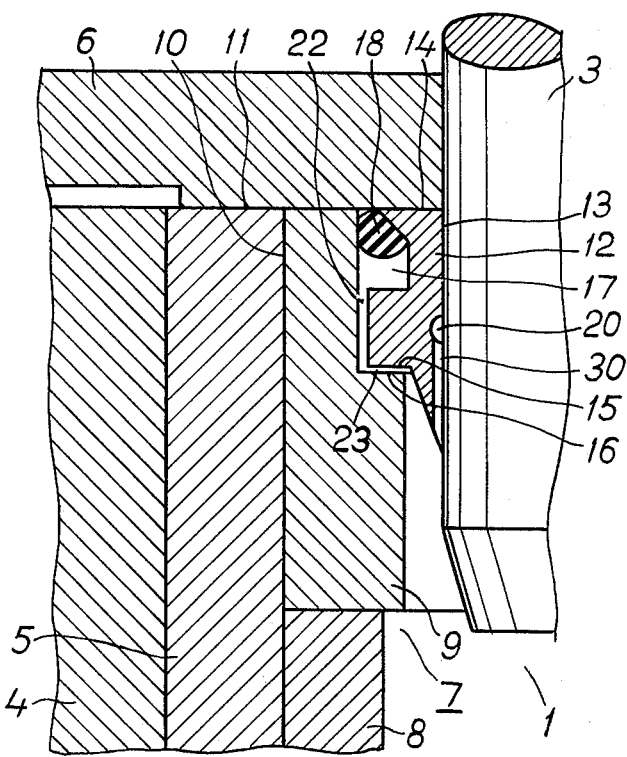
FIG. 3 shows an alternat embodiment.
Figure 4:
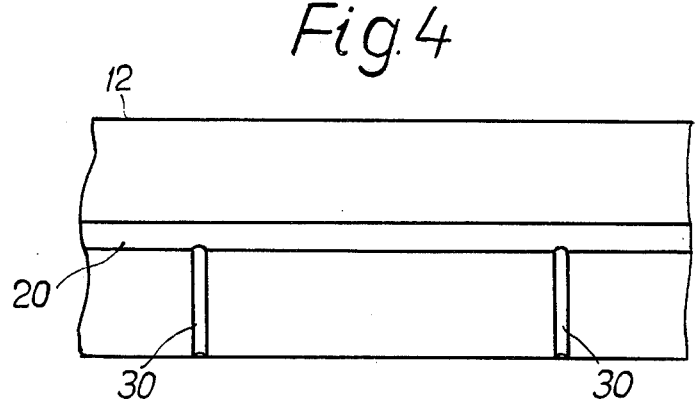
FIG. 4 is a view of the inner s ...ce of a ring according to FIG. 3.

In the embodiment according to FIGS. 3 and 4, the ring 12 is shaped with an annular groove 20 and with a number of axial grooves 30 between the groove 20 and the inner end of the ring 12.

Figure 5:
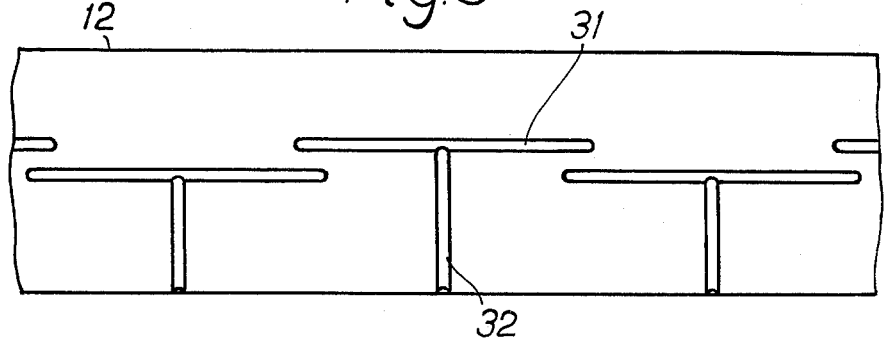
FIG. 5 is a further alternative embodiment of ring slots.

In the embodiment according to FIG. 5, the ring is shaped with a number of tangential grooves 31 which are connected to the pressure space through one axial groove 32 each.

We Claim:

1. In a high pressure press with a pressure chamber intended to enclose a pressure medium, a seal assembly comprising a high-pressure cylinder, an axially movable piston projecting into the high-pressure clyinder, a seal holder at the end of the high-pressure cylinder, first and second sealing rings of metal, the first ring having an outer surface making contact with the cylinder wall and an end surface making contact with the seal holder, the second ring having an inner cylindrical surface making contact with the piston and an end surface making contact with the seal holder, the inner surface of the second ring containing at least one depression, and means connecting said depression with the pressure-medium-filled space of the pressure chamber.

2. High pressure press according to claim 1, in which said depression is a tangential groove and said connecting means comprises at least one hole through the ring.

3. High pressure press according to claim 2 in which the tangential groove is located approximately in the middle of the second sealing ring.

4. High pressure press according to claim 1, in which said depression is a tangential groove and said connecting means comprises at least one substantially axially extending groove.

* * * * *